United States Patent
Yu et al.

(10) Patent No.: US 9,807,209 B2
(45) Date of Patent: Oct. 31, 2017

(54) MOBILE TERMINAL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chao Yu, Beijing (CN); Rui Liu, Beijing (CN); Hao Zhang, Beijing (CN); Hyungkyu Kim, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/773,471

(22) PCT Filed: Jan. 13, 2015

(86) PCT No.: PCT/CN2015/070618
§ 371 (c)(1),
(2) Date: Sep. 8, 2015

(87) PCT Pub. No.: WO2015/180498
PCT Pub. Date: Dec. 3, 2015

(65) Prior Publication Data
US 2016/0112550 A1 Apr. 21, 2016

(30) Foreign Application Priority Data
May 30, 2014 (CN) .......................... 2014 1 0239808

(51) Int. Cl.
H04M 1/02 (2006.01)
H01M 2/02 (2006.01)
(Continued)

(52) U.S. Cl.
CPC ......... *H04M 1/0202* (2013.01); *H01M 2/022* (2013.01); *H01M 2/1022* (2013.01);
(Continued)

(58) Field of Classification Search
CPC .. H04M 1/0262; H04M 1/026; H04M 1/0247; H04M 1/0264; H01M 2/1022;
(Continued)

(56) References Cited

U.S. PATENT DOCUMENTS 5,369,802 A 11/1994 Murray
2003/0235031 A1 12/2003 Lo
(Continued)

FOREIGN PATENT DOCUMENTS

CN 1829106 A 9/2006
CN 201233921 Y 5/2009
(Continued)

OTHER PUBLICATIONS

International Search Report and Written Opinion both dated Apr. 3, 2015; PCT/CN2015/070618.
(Continued)

*Primary Examiner* — Nizar Sivji
(74) *Attorney, Agent, or Firm* — Ladas & Parry LLP

(57) ABSTRACT

A mobile terminal, including: a main body in which a semicircle-shaped, cell chamber with an opened end is provided, wherein one inner side of the cell chamber is provided with a plurality of groups of electrode contacts, and the other inner side of the cell chamber is provided with a plurality of sliding tracks at locations corresponding to the plurality of groups of electrode contacts, respectively; and a semicircle-shaped cell having one side provided with a plurality of groups of electrodes configured to be engaged with the electrodes, and the other side provided with a plurality of positioning tracks configured to be engaged with
(Continued)

the sliding tracks. The mobile terminal allows replacing a cell in a switched-on state without opening a back cover of the main body.

15 Claims, 2 Drawing Sheets

(51) Int. Cl.
*H01M 2/10* (2006.01)
*H01M 2/30* (2006.01)
*H01M 10/04* (2006.01)

(52) U.S. Cl.
CPC ............ *H04M 1/0262* (2013.01); *H01M 2/30* (2013.01); *H01M 10/0436* (2013.01); *H01M 2220/30* (2013.01); *H04M 2001/0204* (2013.01)

(58) Field of Classification Search
CPC ........... H01M 10/0436; H01M 10/425; H01M 10/4257; H01M 2/0207; H01M 10/647; H01M 2220/30; H01M 2/1061; H01M 2/1077; H02J 7/0045; H02J 17/00; H02J 7/02

See application file for complete search history.

(56) References Cited

U.S. PATENT DOCUMENTS

| | | | |
|---|---|---|---|
| 2006/0214629 A1 | 9/2006 | Tsai et al. | |
| 2006/0220611 A1 | 10/2006 | Choi | |
| 2006/0226804 A1* | 10/2006 | Lu | H01M 2/1066 320/107 |
| 2008/0124627 A1* | 5/2008 | Shimoyama | H01M 2/1077 429/186 |
| 2010/0188048 A1* | 7/2010 | Nishino | H01M 2/166 320/120 |
| 2011/0024295 A1* | 2/2011 | Callahan | H01M 8/0245 204/538 |
| 2012/0092839 A1 | 4/2012 | Lai | |

FOREIGN PATENT DOCUMENTS

| | | |
|---|---|---|
| CN | 201270545 Y | 7/2009 |
| CN | 201674537 U | 12/2010 |
| CN | 101964410 A | 2/2011 |
| CN | 103997554 A | 8/2014 |

OTHER PUBLICATIONS

First Chinese Office Action dated Jan. 22, 2016; Appln. No. 201410239808.5.

\* cited by examiner

MOBILE TERMINAL

TECHNICAL FIELD

Embodiments of the present invention relate to a mobile terminal.

BACKGROUND

Mobile phones, as an electronic device widely used in modern society, have been encountered with increasingly strict requirements on operational convenience from users. One of the important factors for a mobile phone to be accommodated to the rapid changing consumer market is the ease of operation.

Recent designs of mobile phones usually focus on optimizing the software operation but often ignore the improvement on hardware operation. For example, a cell for use in a mobile phone, generally, is either an un-replaceable built-in one or a replaceable one. The un-replaceable (built-in) cell is known as having to be charged on demands. Therefore, under the circumstance where it's not available for an external charger, the design of replaceable cell is more advantageous.

One of the known structures for the mobile phone using a replaceable cell is to have a back cover into which a quadrate cell can be inserted; and during replacement of the cell, it has to, firstly, pry off the back cover and dig out the cell (in a switched-off state without power supply), then insert a new cell and re-assemble the back cover, and finally switch on the mobile phone for normal use. Such operation requires a large number of human labors and also costs considerable time, especially for those specific models with a back cover hard to be moved, which leads to challenge and difficulty for hand-disabled users; furthermore, it would result in damage to the mobile phone itself, and also plenty of dust and other impurities entering the mobile phone when the back cover thereof is removed, which bring in several hidden dangers for the normal use of the mobile phone.

SUMMARY

At least one embodiment of the present invention provides a mobile terminal, comprising: a main body in which a semicircle-shaped, cell chamber with an opened end is provided, wherein one inner side of the cell chamber is provided with a plurality of groups of electrode contacts, and the other inner side of the cell chamber is provided with a plurality of sliding tracks at locations corresponding to the plurality of groups of electrode contacts, respectively; and a semicircle-shaped cell having one side provided with a plurality of groups of electrodes configured to be engaged with the electrode contacts, and the other side provided with a plurality of groups of positioning tracks configured to be engaged with the sliding tracks.

In an example, the electrode contacts and the electrodes are configured such that each group of electrode contacts is arranged in correspondence with one group of electrodes upon the cell being received in the cell chamber.

In an example, each of the electrodes is formed as a conductive arc-shaped track; and the plurality of groups of electrodes have radii different from each other; and the electrode contacts in each group of electrode contacts are arranged along an arc line coincident with a corresponding conductive arc-shaped track upon the cell being received in the cell chamber.

In an example, each group of electrode contacts comprises two electrode contacts arranged in symmetry.

In an example, the cell chamber is provided with three groups of electrode contacts, comprising a group of anode contacts, a group of test contacts and a group of cathode contacts; and the cell is provided with three groups of electrodes, comprising a group of positive electrodes, a group of test electrodes and a group of negative electrodes.

In an example, the electrode has a concaved structure.

In an example, a surface of the electrode comprises an arc-shaped copper sheet.

In an example, the sliding tracks and the positioning tracks are configured such that the plurality of sliding tracks and the plurality of positioning tracks are arranged in one-to-one correspondence upon the cell being received in the cell chamber.

In an example, each of the sliding tracks is formed as an arc-shaped, concaved track concentric with the semicircle-shaped, cell chamber; each of the positioning tracks is formed as an arc-shaped, raised track concentric with the semicircle-shaped cell; and the concaved track is coincident with the raised track upon the cell being received in the cell chamber.

In an example, three sliding tracks and three positioning tracks are provided.

In an example, the opened end of the semicircle-shaped cell chamber is provided with a dust cap.

In an example, an arc edge of the semicircle-shaped cell is provided with a ledge.

In an example, a straight edge of the semicircle-shaped cell is provided with a saw tooth structure.

In an example, both ends of each of the electrodes of the semicircle-shaped cell and/or both ends of each of the sliding tracks of the semicircle-shaped cell chamber are provided with a trumpet-like opening.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 1:
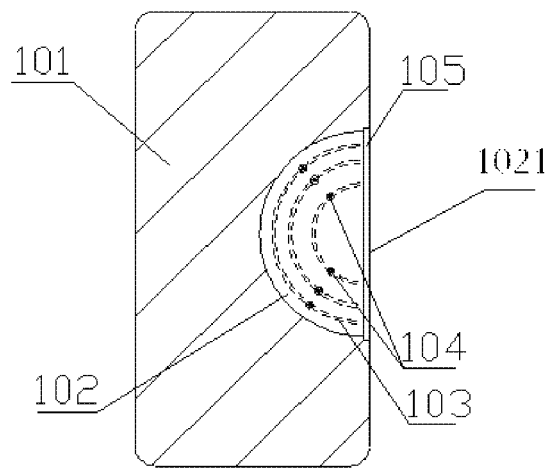
FIG. 1 is a schematic diagram illustrating a structure of a main body in the mobile terminal as provided by an embodiment of the present invention.
Figure 2:
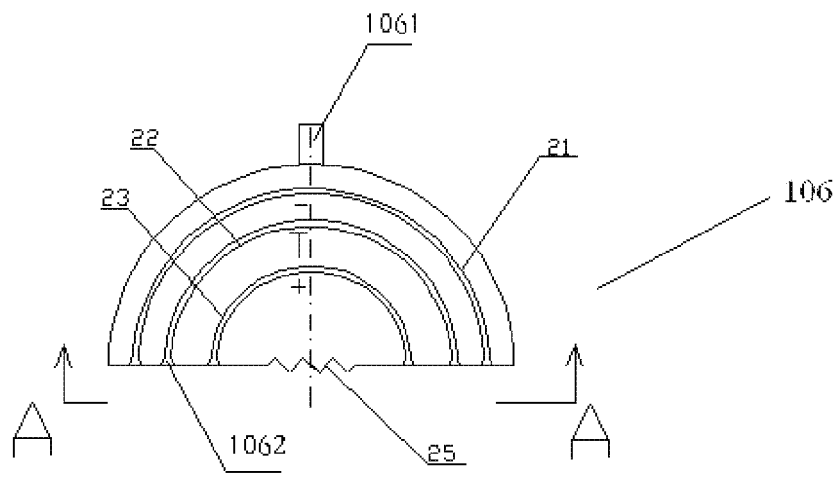
FIG. 2 is a front view illustrating a structure of a cell in the mobile terminal as provided by an embodiment of the present invention.

Embodiments of the present invention provide a mobile terminal as illustrated in FIGS. 1-2, comprising a main body 101 and a semicircle-shaped cell 106; an interior of the main body 101 is provided with a semicircle-shaped, cell chamber 102 with an opened end 1021, wherein the semicircle-shaped, cell chamber 102 is configured to allow the semicircle-shaped cell 106 to be received therein or discharged there-from, through the opened end 1021.

Still referring to FIG. 1, in an example, the semicircle-shaped cell chamber 102 has one inner side provided with a plurality of groups of electrode contacts 104, and the other inner side provided with a plurality of sliding tracks 103 at locations corresponding to the plurality of groups of electrode contacts 104, respectively; that is, the electrode contacts 104 in each group of electrode contacts 104 are arranged along a trace corresponding to one sliding track 103.

For example, in case where the sliding track 103 in the cell chamber 102 is formed as an arc-shaped track 103 which is concentric with the cell chamber, the electrode contacts 104 in each group of electrode contacts 104 are arranged along an arc line corresponding to the corresponding arc-shaped track 103; in this case, since the plurality of sliding tracks 103 certainly are different from each other in their radii, the arc lines in correspondence with the plurality of groups of electrode contacts 104 also have different radii from each other.

Figure 3:
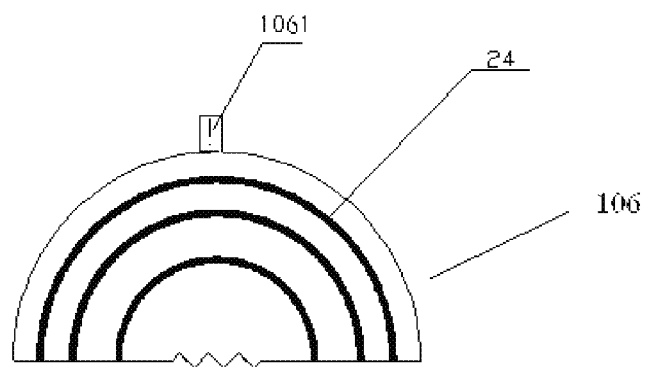
FIG. 3 is a rear view illustrating a structure of a cell in the mobile terminal as provided by an embodiment of the present invention.
Figure 4:
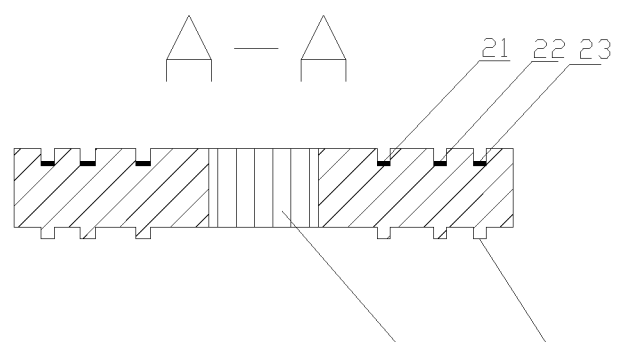
FIG. 4 is a cross-sectional view illustrating the cell of FIG. 2 taken along direction A-A.

In an example, as illustrated in FIG. 2 through FIG. 4, the semicircle-shaped cell 106 has one side provided with a plurality of groups of electrodes configured to be contacted with the electrode contacts 104 in the semicircle-shaped cell chamber 102 (see FIG. 2 and FIG. 4), and the other side provided with a plurality of positioning tracks 24 at locations corresponding to the plurality of groups of electrodes respectively, configured to be engaged with the sliding tracks 103 in the semicircle-shaped cell chamber 102 (FIG. 3 and FIG. 4) so that the cell 106 is able to be sliding into the cell chamber 102.

For example, as illustrate in FIG. 2, the plurality of groups of electrodes in the semicircle-shaped cell 106 are formed as three conductive arc-shaped tracks 21, 22, 23 which are concentric with the semicircle-shaped cell 106 and each comprising, for example, an arc-shaped copper sheet, wherein the radii of these three groups of electrodes are different from each other. Although three groups of electrodes 21, 22, 23 are illustrated in FIG. 3, the present invention is not limited thereto. In this case, the plurality of positioning tracks 24 on the semicircle-shaped cell 106 are also formed as a plurality of arc-shaped tracks which are concentric with the cell 106 and are arranged in one-to-one correspondence with the plurality of electrodes. Similarly, although three positioning tracks 24 are illustrated in FIG. 3, the present invention is not limited thereto.

In an example, the electrode contact in the cell chamber 102 and the electrode on the cell 106 are configured such that each group of electrode contacts 104 is arranged corresponding to one group of electrodes upon the cell 106 being received in the cell chamber 102, in order to ensure that the cell 106 is smoothly received in or discharged from the cell chamber 102. The term "corresponding to" as used herein means that the electrode contacts 104 in each group of electrode contacts 104 are arranged along a trace coincident with the corresponding group of electrodes. For example, in the case where the electrodes are formed as three conductive arc-shaped tracks 21, 22, 23 concentric with the semicircle-shaped cell 106 (as illustrated in FIG. 2), the electrode contacts 104 in each group of electrode contacts should be arranged along an arc line coincident with one of the conductive arc-shaped tracks 21, 22 and 23 upon the cell 106 is sliding into and completely received by the cell chamber 102. In this way, each electrode contact 104 is sufficiently contacted with a corresponding electrode (i.e., a conductive track) and smoothly sliding therein, during the cell 106 being received in or discharged from the cell chamber 102.

In an example, the electrode has a concaved structure, for example, it can be formed as a conductive, arc-shaped, concaved track which is concentric with the cell 106.

In an example, the electrode contact 104 can be a spring-like bead or a spring-like metal.

In an example, the electrode contacts 104 are arranged in three groups comprising a group of anode contacts, a group of test contacts, and a group of cathode contacts. In this case, the electrodes are correspondingly arranged in three groups comprising a group of positive electrodes 21, a group of test electrodes 23, and a group of negative electrodes 22.

In an example, each group of electrode contacts 104 comprises two electrode contacts which are arranged in symmetry, in order to ensure that both a new cell and an old cell to be replaced by the new cell can be contacted with the electrode contacts 104.

Similarly, in an example, the sliding track 103 in the cell chamber 102 and the positioning track 24 on the cell are configured such that the plurality of sliding tracks 103 are arranged in one-to-one correspondence with the plurality of positioning tracks 24 upon the cell 106 being received in the cell chamber 102, in order to ensure that the cell 106 is smoothly received in or discharged from the cell chamber 102. The term "in one-to-one correspondence with" used herein means that each sliding track 103 is coincident with one positioning track 24. For example, as illustrated in FIG. 4, the positioning track 24 is formed as an arc-shaped, raised track concentric with the cell 106, and the sliding track 103 is correspondingly formed as an arc-shaped, concaved, sliding track; furthermore, each sliding track 103 is coincident with one corresponding positioning track 24 upon the cell 106 being received in the cell chamber 123. In this way, the positioning tracks 24 can be sufficiently contacted with the corresponding sliding tracks 103 respectively and smoothly sliding therein, during the cell 106 is received in or discharged from the cell chamber 102.

In an example, the number of the positioning tracks 24 is configured to be identical with that of the sliding tracks 103, in order to ensure that the cell 106 is stably received in the cell chamber 102. For example, it's provided with three positioning tracks 24 for the case where three sliding tracks 103 are arranged. It should be explained that the number of the positioning tracks 24 can be different from that of the sliding tracks 103 in other embodiments of the present invention.

In an example, the opened end 1021 of the semicircle-shaped cell chamber 102 in the main body is provided with a dust cap 105 which is configured to protect against both dust and water, in order to prevent the mobile terminal from being contaminated by dust or being corroded by liquid. The dust cap of the cell chamber can be designed according to mature technology well-known in the related art, which will not be described in details herein.

In an example, an arc edge of the semicircle-shaped cell 106 is provided with a ledge 1061 configured to increase friction for convenience of a user who can rotate the cell 106 by operating the ledge 1061 so that the cell 106 is received into the cell chamber 102 in a sliding-rotation manner. The ledge 1061 can have any of the shapes well-known in the related art capable of achieving corresponding functions, without details or otherwise limitations herein.

In an example, both ends of the electrode on the semicircle-shaped cell 106 and/or both ends of the sliding track 103 in the semicircle-shaped cell chamber 102 are provided with a trumpet-like opening 1062, in order to ensure a better engagement between the positioning track 24 and the sliding track 103. The trumpet-like opening 1062 can have a width larger than that of the electrode/sliding track by 15%, so as to facilitate the user rotating the semicircle-shaped cell to be received into the semicircle-shaped cell chamber.

In an example, the electrode contacts 104 in a same group (that is, electrode contacts have the same function) can be provided with a resistor there-between, wherein the resistor has an appropriate resistance to complement a voltage difference between the new cell and the old cell to be replaced by the new cell, so as to prevent from any damage resulted from a small voltage difference.

Figure 5:
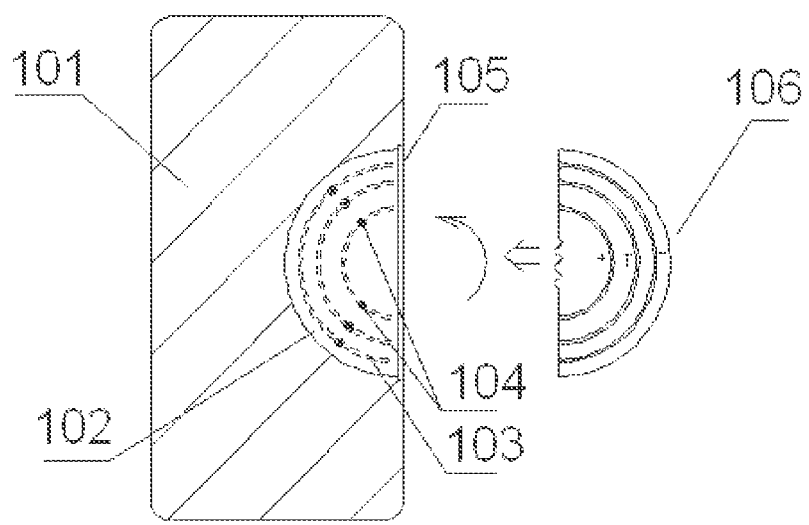
FIG. 5 is a schematic diagram illustrating a mobile terminal as provided by an embodiment of the present invention assembled with a cell.

Hereinafter an operation of replacing an old cell in the mobile terminal as provided by embodiments of the present invention is described in details with a mobile phone by way of example in conjunction with FIG. 5.

First of all, moving the dust cap 105 to expose the opened end 1021, and aligning a straight edge of an old semicircle-shaped cell with a straight edge of a new semicircle-shaped cell to allow a combination of them representing a round shape.

Then operating the ledge 1061 formed on an arc edge of the new cell to allow the new cell progressively rotating into the cell chamber 102 through the positioning track 24 of the new cell engaging with the sliding track 103 in the cell chamber 102, and also allow the old cell progressively rotating out of the cell chamber 102 until completely disengaging there-from by sliding its positioning track 24 along the sliding track 103 at the same time. During this operation, both of the old cell and new cell are rotated by 180 degrees.

During replacing the old cell with the new cell, the electrodes of the old cell are firstly disengaged from one group of electrodes of the mobile phone system, which is subsequently contacted with the electrodes of the new cell so that the new cell and the old cell are correlated as if they are in parallel connection to ensure continuous power supply of the mobile phone. Upon the old cell being completely disengaged from the main body, both groups of electrodes of the mobile phone system are contacted with the electrodes of the new cell.

In an example, for facilitating the above-mentioned replacement of cell, as illustrated in FIG. 3 through FIG. 4, the straight edge of the semicircle-shaped cell 106 is provided with a saw tooth structure, which can prevent the old cell and the new cell from any improper shift during their alignment and rotation, and which is especially advantageous in ensuring proper positioning during an initial period of aligning the new cell with the old cell and rotating the new cell into the cell chamber, thereby providing users with convenient operation. For example, the saw tooth structure additionally arranged in the present embodiment can be formed to be symmetric about its center, so that the cells in the mobile terminal can be made in a uniform shape without the trouble of cell classification when used.

As above, the mobile terminal as provided by embodiments of the present invention is advantageous in at least any one of following.

(1) The old cell is rotated out to be disengaged from the cell chamber as the new cell is rotated into the cell chamber, which provides more convenient and quick operation of cell replacement as compared with exiting technology.

(2) The cell and the main body are electrically connected in a modified manner such that the main body is continuously supplied with sufficient electric power during the cell replacement, which makes it possible to replace the cell with the mobile terminal switched on, thereby eliminating tedious steps of switching off the mobile terminal for replacing cell and then switching on the mobile terminal for normal use.

(3) It avoids frequently prying off a back cover of the mobile terminal for cell replacement, and hence reduces the risk of damaging or contaminating the mobile terminal.

(4) It eliminates the action of digging a cell with fingers, and hence provides convenience for hand-disabled users to some extent when they attempt to replace a cell.

(5) It reduces the space of the cell occupied in the mobile terminal to the greatest extent by designing the cell to be semicircle-shaped, which facilitates expanding other components of the mobile terminal or dissipating heat.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201410239808.5 filed on May 30, 2014 titled "A MOBILE TERMINAL", which is incorporated herein by reference in its entirely.

What is claimed is:
1. A mobile terminal, comprising:
  a main body in which a semicircle-shaped, cell chamber with an opened end is provided, wherein one inner side of the cell chamber is provided with a plurality of groups of electrode contacts, and the other inner side of the cell chamber is provided with a plurality of sliding tracks at locations corresponding to the plurality of groups of electrode contacts, respectively; and
  a semicircle-shaped cell having one side provided with a plurality of groups of electrodes configured to be engaged with the electrode contacts, and the other side provided with a plurality of positioning tracks configured to be engaged with the sliding tracks, wherein the semicircle-shaped cell is configured to be rotatably fitted into the semicircle-shaped, cell chamber to power the mobile terminal, wherein the plurality of groups of electrode contacts and the plurality of groups of electrodes are configured such that each group of electrode contacts is arranged in correspondence with one group of electrodes upon the cell being received in the cell chamber.

2. The mobile terminal of claim 1, wherein each of the electrodes is formed as a conductive arc-shaped track, and the plurality of groups of electrodes have radii different from each other; and the electrode contacts in each group of electrode contacts are arranged along an arc line coincident with a corresponding conductive arc-shaped track upon the cell being received in the cell chamber.

3. The mobile terminal of claim 1, wherein each group of electrode contacts comprises two electrode contacts arranged in symmetry.

4. The mobile terminal of claim 1, wherein, the cell chamber is provided with three groups of electrode contacts comprising a group of anode contacts, a group of test contacts and a group of cathode contacts; and the cell is provided with three groups of electrodes comprising a group of positive electrodes, a group of test electrodes and a group of negative electrodes.

5. The mobile terminal of claim 1, wherein the electrode has a concaved structure.

6. The mobile terminal of claim 5, wherein a surface of the electrode comprises an arc-shaped copper sheet.

7. The mobile terminal of claim 1, wherein, the sliding tracks and the positioning tracks are configured such that the plurality of sliding tracks and the plurality of positioning tracks are arranged in one-to-one correspondence upon the cell being received in the cell chamber.

8. The mobile terminal of claim 7, wherein, each of the sliding tracks is formed as an arc-shaped, concaved track concentric with the semicircle-shaped cell chamber;

each of the positioning tracks is formed as an arc-shaped, raised track concentric with the semicircle-shaped cell; and the concaved track is coincident with the raised track upon the cell being received in the cell chamber.

9. The mobile terminal of claim 7, wherein three sliding tracks and three positioning tracks are provided.

10. The mobile terminal of claim 1, wherein the opened end of the semicircle-shaped cell chamber is provided with a dust cap.

11. The mobile terminal of claim 1, wherein an arc edge of the semicircle-shaped cell is provided with a ledge.

12. The mobile terminal of claim 1, wherein a straight edge of the semicircle-shaped cell is provided with a saw tooth structure.

13. The mobile terminal of claim 1, wherein both ends of each of the electrodes of the semicircle-shaped cell andor both ends of each of the sliding tracks of the semicircle-shaped cell chamber are provided with a trumpet-like opening.

14. The mobile terminal of claim 3, wherein, the cell chamber is provided with three groups of electrode contacts comprising a group of anode contacts, a group of test contacts and a group of cathode contacts; and the cell is provided with three groups of electrodes comprising a group of positive electrodes, a group of test electrodes and a group of negative electrodes.

15. The mobile terminal of claim 14, wherein, each of the sliding tracks is formed as an arc-shaped, concaved track concentric with the semicircle-shaped cell chamber;

each of the positioning tracks is formed as an arc-shaped, raised track concentric with the semicircle-shaped cell; and the concaved track is coincident with the raised track upon the cell being received in the cell chamber.

* * * * *